(12) United States Patent
Wright et al.

(10) Patent No.: US 12,470,521 B2
(45) Date of Patent: Nov. 11, 2025

(54) ROUTING NETWORK TRAFFIC USING ROUTER-TERMINATED VIRTUAL PRIVATE NETWORK (VPN) CLIENT SESSIONS

(71) Applicant: Charter Communications Operating, LLC, St. Louis, MO (US)

(72) Inventors: Ethan Wright, Denver, CO (US);
Wystan Schmidt, Denver, CO (US);
Micah Labbee, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 984 days.

(21) Appl. No.: 17/075,394

(22) Filed: Oct. 20, 2020

(65) Prior Publication Data

US 2022/0124071 A1    Apr. 21, 2022

(51) Int. Cl.
*H04L 9/40*    (2022.01)

(52) U.S. Cl.
CPC ...... *H04L 63/0272* (2013.01); *H04L 63/0263* (2013.01)

(58) Field of Classification Search
CPC ........................ H04L 63/0272; H04L 63/0263
See application file for complete search history.

(56) References Cited

U.S. PATENT DOCUMENTS

| | | | | |
|---|---|---|---|---|
| 6,304,973 B1 * | 10/2001 | Williams | ............ | H04L 63/0272 713/153 |
| 6,765,914 B1 * | 7/2004 | Jain | ...................... | H04L 45/583 370/395.31 |
| 6,931,016 B1 * | 8/2005 | Andersson | .......... | H04L 63/0272 370/260 |
| 2002/0126667 A1 * | 9/2002 | Oguchi | ................... | H04L 45/04 370/352 |
| 2002/0156828 A1 * | 10/2002 | Ishizaki | .............. | H04L 41/5061 709/201 |
| 2004/0205188 A1 * | 10/2004 | Ahlard | ................ | H04L 12/1854 709/224 |
| 2004/0215957 A1 * | 10/2004 | Moineau | ............... | H04W 12/06 713/153 |
| 2005/0129019 A1 * | 6/2005 | Cheriton | ................ | H04L 63/08 709/240 |
| 2006/0206934 A1 * | 9/2006 | Ammirata | ........... | H04L 63/0272 726/15 |

(Continued)

*Primary Examiner* — Piotr Poltorak
(74) *Attorney, Agent, or Firm* — Dority & Manning, P.A.

(57) ABSTRACT

Routing network traffic using router-terminated virtual private network (VPN) client sessions is disclosed herein. In one embodiment, a router computing device receives an indication of an association between a client computing device and VPN configuration data for a VPN, the indication comprising an identifier of the client computing device and the VPN configuration data. The router computing device binds a VPN client session instantiated by the router computing device to a network interface and implements a firewall rule to route network traffic to and from the client computing device via the network interface. The router computing device establishes a connection with the VPN using the VPN client session and the VPN configuration data. Finally, the router computing device receives network traffic for the client computing device and routes the network traffic via the network interface.

23 Claims, 8 Drawing Sheets

(56) References Cited

U.S. PATENT DOCUMENTS

| | | | | |
|---|---|---|---|---|
| 2008/0134316 | A1* | 6/2008 | Devonshire | G06F 9/548 726/15 |
| 2008/0148386 | A1* | 6/2008 | Kreuk | H04L 63/0272 726/15 |
| 2010/0043068 | A1* | 2/2010 | Varadhan | H04L 45/50 726/15 |
| 2010/0284409 | A1* | 11/2010 | Lv | H04L 63/0272 370/395.31 |
| 2012/0030751 | A1* | 2/2012 | Datta | H04L 63/164 726/15 |
| 2012/0158973 | A1* | 6/2012 | Jacobson | H04L 65/1069 709/227 |
| 2013/0318345 | A1* | 11/2013 | Hengeveld | H04L 12/4633 713/168 |
| 2014/0226818 | A1* | 8/2014 | Wang | H04W 12/04 380/270 |

\* cited by examiner

ROUTING NETWORK TRAFFIC USING ROUTER-TERMINATED VIRTUAL PRIVATE NETWORK (VPN) CLIENT SESSIONS

BACKGROUND

A virtual private network (VPN) enables a client computing device to access a private network via a publicly accessible network such as the internet, and to send network traffic over the publicly accessible network as if the client computing device were directly connected to the private network. The VPN may be used to encrypt or otherwise secure network traffic between the client computing device and a VPN server of the VPN, and may allow the client computing device to access locale-specific content that otherwise would be subject to restrictions based on the network device's geographical location. Conventional approaches for connecting a client computing device to a VPN require either that the client computing device itself be capable of executing VPN client software or that the client computing device connect to another network device (such as a router) that provides a VPN connection through which all network traffic that passes through the network device is routed.

SUMMARY

The embodiments disclosed herein perform routing of network traffic using router-terminated virtual private network (VPN) client sessions to enable multiple client-specific VPN connections to be managed by a router computing device. Each VPN connection may be used to route network traffic for a different client computing device or group of client computing devices connected to the router computing device without requiring special configuration or installation of VPN client software on the client computing device(s).

In one embodiment, a method is provided. The method comprises receiving, by a router computing device, an indication of an association between a client computing device and VPN configuration data for a VPN, the indication comprising an identifier of the client computing device and the VPN configuration data. The method further comprises binding, by the router computing device, a VPN client session instantiated by the router computing device to a network interface. The method also comprises implementing, by the router computing device, a firewall rule to route network traffic to and from the client computing device via the network interface. The method additionally comprises establishing, by the router computing device, a connection with the VPN using the VPN client session and the VPN configuration data. The method further comprises receiving, by the router computing device, network traffic for the client computing device. The method also comprises routing, by the router computing device, the network traffic via the network interface.

In another embodiment, a router computing device is provided. The router computing device comprises a system memory, and a processor device communicatively coupled to the system memory. The processor device is configured to receive an indication of an association between a client computing device and VPN configuration data for a VPN, the indication comprising an identifier of the client computing device and the VPN configuration data. The processor device is further configured to bind a VPN client session instantiated by the router computing device to a network interface. The processor device is also configured to implement a firewall rule to route network traffic to and from the client computing device via the network interface. The processor device is additionally configured to establish a connection with the VPN using the VPN client session and the VPN configuration data. The processor device is further configured to receive network traffic for the client computing device. The processor device is also configured to route the network traffic via the network interface.

In another embodiment, a server computing device is provided. The server computing device comprises a system memory, and a processor device communicatively coupled to the system memory. The processor device is configured to obtain VPN configuration data for a VPN. The processor device is further configured to associate a client computing device with the VPN configuration data. The processor device is also configured to transmit an indication of the association between the client computing device and the VPN configuration data to a router computing device, the indication comprising an identifier of the client computing device and the VPN configuration data.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, a virtual private network (VPN) enables a client computing device (e.g., a desktop or laptop computer, a smartphone, or a streaming media device, as non-limiting examples) to access a private network via a publicly accessible network such as the internet. Using the VPN, the client computing device can send network traffic over the publicly accessible network as if the client computing device were directly connected to the private network. The connection between the client computing device and a VPN server of the VPN may employ encryption to secure the network traffic sent over the connection. Additionally, because network accesses made over the VPN by the client computing device will appear to originate from the VPN server, the client computing device may use the VPN to access locale-specific content that otherwise would be subject to restrictions based on the network device's geographical location.

Conventional approaches to accessing a VPN require either that the client computing device itself be capable of executing VPN client software, or that the client computing device connect to another network device (such as a router) that provides a VPN connection through which all network traffic to and from the network device are routed. These limitations may pose issues in scenarios in which multiple client computing devices require connections to different VPNs, but the client computing devices are, for example, "headless" devices (i.e., lacking monitors, keyboards, and mice) that are not configured to execute VPN client software.

In this regard, embodiments disclosed herein perform routing of network traffic using router-terminated VPN client sessions. In one embodiment, a router computing device is configured to instantiate VPN client sessions on a per-client or per-group basis, such that multiple client computing devices and/or groups of client computing devices can each access different VPNs via the router computing device without having to execute separate VPN client software. The term "VPN client session" or derivations thereof, as used herein, refers collectively to the processing time and resources allocated by the router computing device for maintaining a connection with a VPN for use by a specific client computing device or group of client computing devices connected to the router computing device. The VPN client sessions are referred to herein as "router-terminated" because, from the perspective of the VPN, the router computing device is one endpoint of the VPN connection through which the client computing device(s) access the VPN (with the other endpoint being the VPN itself).

The router computing device first receives an indication of an association between a client computing device and VPN configuration data for a VPN. The term "indication of an association" or derivations thereof, as used herein, refers to data that identifies the client computing device (or multiple client computing devices belonging to a client computing device group that will share a VPN client session) and the VPN configuration data used to establish a VPN client session for use by that client computing device (or client computing device group). The VPN configuration data may include authentication data for the VPN, a selection of a specific VPN server, and/or a selection of a specific VPN location, as non-limiting examples.

The router computing device next binds a VPN client session instantiated by the router computing device to a network interface. The term "network interface" or derivations thereof, as used herein, refers to a software interface, defined by the router computing device, that operates as a point of interconnection between the router computing device and other network devices such as the client computing device. The router computing device then implements a firewall rule to route network traffic to and from the client computing device via the network interface. The term "firewall rule" and derivations thereof, as used herein, refer to a network traffic control rule that specifies what network traffic is allowed to enter the network interface, and how that network traffic is to be routed by the router computing device. The firewall rule may be automatically generated by the router computing device or manually specified by a user, and may be defined, e.g., using a software-defined networking (SDN) standard such as OpenFlow or a utility such as iptables, as non-limiting examples.

After binding the VPN client session to the network interface and implementing the firewall rule, the router computing device establishes a connection with the VPN using the VPN client session and the VPN configuration data. Subsequently, the router computing device receives network traffic (i.e., outbound network traffic received from the client computing device and inbound network traffic directed to the client computing device) and routes the network traffic via the network interface. In this manner, client computing devices may take advantage of VPN functionality using dedicated VPN client sessions without needing to be configured to install and execute VPN client software.

In some embodiments, a server computing device works in conjunction with the router computing device to provide the router-terminated VPN client sessions. The server computing device first obtains the VPN configuration data (e.g., from a VPN configuration database, or from a user). The server computing device then associates the client computing device with the VPN configuration data. To associate the client computing device with the VPN configuration data, the server computing device may first provide the user with a list of known client computing devices at a user's location. The server computing device may then associate the client computing device with the VPN configuration, e.g., based on input from a user indicating the association, or by defining a client computing device group that includes multiple client computing devices including the client computing device and associating the client computing device group with the VPN configuration data. In the latter case, the client computing device group may be defined based on user input indicating the client computing devices to be included in the group or may be automatically defined based on a common attribute of the client computing devices in the group. For example, the server computing device may associate all streaming media devices among the client computing devices with specific VPN configuration data. After associating the client computing device with the VPN configuration data, the server computing device then transmits the indication of the association between the client computing device and the VPN configuration data to the router computing device for use as described above.

Figure 1:
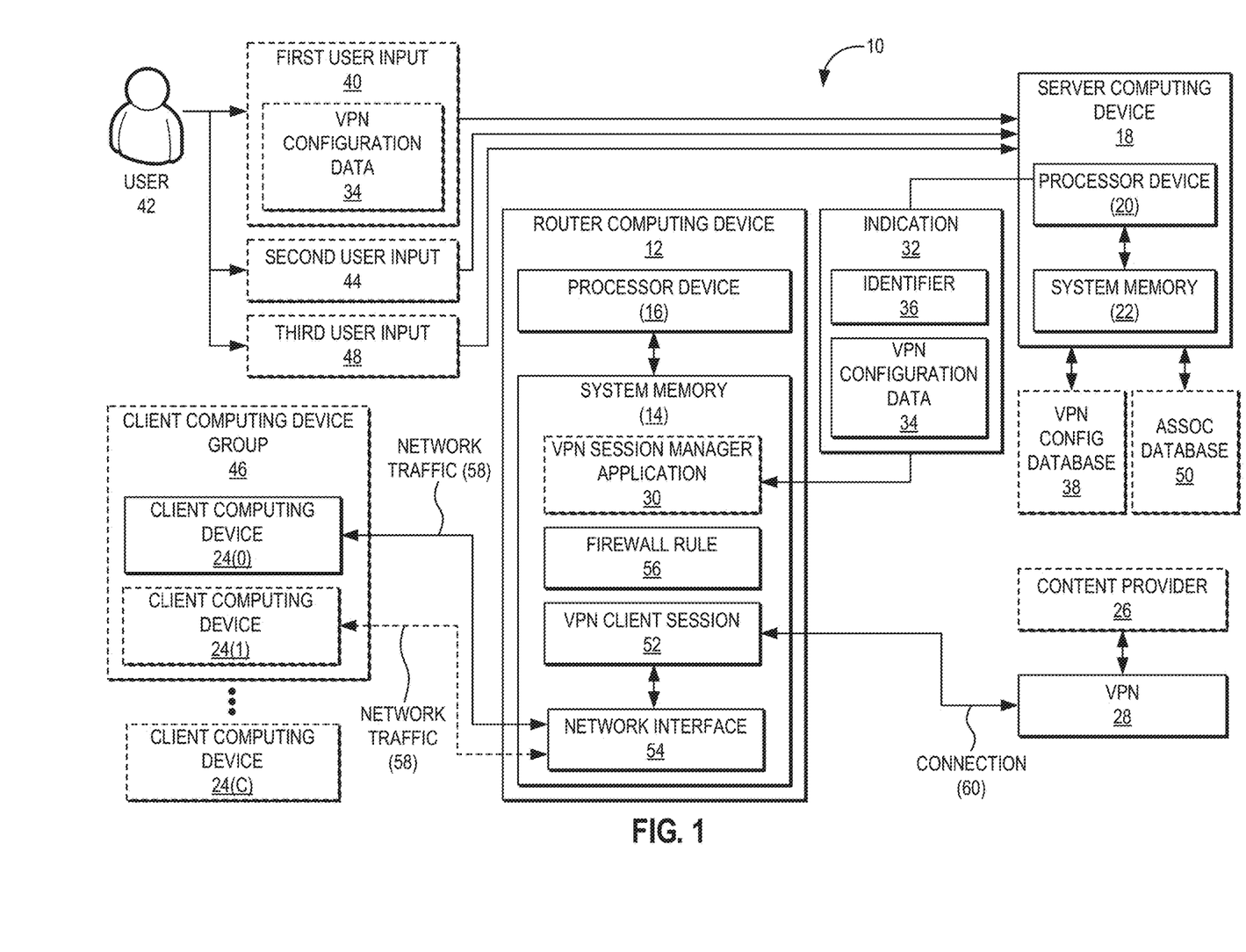
FIG. 1 is a block diagram illustrating an exemplary communications network, including a router computing device and a server computing device, configured to route network traffic using router-terminated virtual private network (VPN) client sessions.

FIG. 1 is a block diagram illustrating an exemplary communications network 10 that may be utilized to perform routing of network traffic using router-terminated VPN client sessions. The communications network 10 in the example of FIG. 1 includes a router computing device 12 comprising a system memory 14 and a processor device 16 communicatively coupled to the system memory 14. The router computing device 12 in some embodiments may comprise a multiple-system operator (MSO) managed wireless router or an MSO managed wired router, as non-limiting examples. The communications network 10 also includes a server computing device 18, which includes a processor device 20 communicatively coupled to a system memory 22. According to some embodiments, the server computing device 18 may comprise an MSO server.

In the example of FIG. 1, the router computing device 12 provides router functionality to a plurality of client computing devices 24(0)-24(C). Accordingly, it is to be understood that network traffic to and from the plurality of client computing devices 24(0)-24(C) passes through the router computing device 12. It is to be further understood that the elements of the communications network 10, including the router computing device 12 and the server computing device 18, are interconnected via a publicly accessible network (e.g., the internet) and/or a private network.

Each of the client computing devices 24(0)-24(C) may represent, as non-limiting examples, a streaming media device (e.g., a ROKU® device, a Chromecast™ device, or an Amazon Fire TV™ device, as non-limiting examples) for accessing streaming content from content providers such as a content provider 26. As such, the client computing devices 24(0)-24(C) may be headless devices that are not easily configured with VPN client software to enable access to a VPN such as the VPN 28. Additionally, while conventional router computing devices may be configured to provide VPN client functionality, such conventional router computing devices typically must use one VPN connection to route network traffic to and from all of the client computing devices 24(0)-24(C).

Accordingly, the router computing device 12 in the example of FIG. 1 executes a VPN session manager application 30 that is configured to perform routing of network traffic using router-terminated VPN client sessions. To provide a VPN connection for a client computing device such as the client computing device 24(0), the VPN session manager application 30 receives, from the server computing device 18, an indication 32 of an association between the client computing device 24(0) and VPN configuration data 34 for the VPN 28. The indication 32 includes an identifier 36 of the client computing device 24(0), along with the VPN configuration data 34.

In some embodiments, the server computing device 18 generates the indication 32 by first obtaining the VPN configuration data 34. The server computing device 18 may obtain the VPN configuration data 34 from a VPN configuration database ("VPN CONFIG DATABASE") 38, or from a first user input 40 that the server computing device 18 receives from a user 42 and that includes the VPN configuration data 34. The server computing device 18 then associates the client computing device 24(0) with the VPN configuration data 34, and transmits the indication 32 to the router computing device 12.

Some embodiments may provide that the server computing device 18 associates the client computing device 24(0) with the VPN configuration data 34 based on a second user input 44 received from the user 42 that indicates the association. For instance, the user 42 may execute a configuration application (not shown) that allows the user 42 to select the client computing device 24(0) from a list of the client computing devices 24(0)-24(C) and to further select the VPN configuration data 34 to associate with the client computing device 24(0). According to some embodiments, the server computing device 18 may define a client computing device group 46 based on a third user input 48 that specifies, for example, the client computing devices 24(0) and 24(1). The server computing device 18 may then associate the client computing device group 46 with the VPN configuration data 34, such that each member of the client computing device group 46 uses the same VPN configuration data 34. In some embodiments, the server computing device 18 may store received user inputs such as the second user input 44 and/or the third user input 48 in an association database ("ASSOC DATABASE") 50, and subsequently may associate the client computing device 24(0) with the VPN configuration data 34 based on the stored user input received from the association database 50.

After receiving the indication 32, the VPN session manager application 30 instantiates a VPN client session 52 and binds the VPN client session 52 to a network interface such as the network interface 54. By binding the VPN client session 52 to the network interface 54, the VPN session manager application 30 ensures that inbound network traffic received by the VPN client session 52 is directed to the network interface 54, and outbound network traffic received via the network interface 54 is directed to the VPN client session 52. The VPN session manager application 30 next implements a firewall rule 56 to route network traffic 58 to and from the client computing device 24(0) (and, in embodiments in which the VPN client session 52 is to be used by the client computing device group 46, the client computing device 24(1)) via the network interface 54. The firewall rule 56 may be automatically generated by the router computing device 12 or manually specified by the user 42, and may be defined, e.g., using an SDN standard such as OpenFlow or a utility such as iptables, as non-limiting examples.

Finally, the VPN session manager application 30 establishes a connection 60 with the VPN 28 using the VPN client session 52. The router computing device 12 subsequently receives the network traffic 58 to and from the client computing device 24(0) (and the client computing device 24(1), in embodiments using the client computing device group 46), and routes the network traffic 58 via the network interface 54. In this manner, the client computing device 24(0) can access, for example, streaming content from the content provider 26 via the VPN 28, the VPN client session 52, and the network interface 54. It is to be understood that the operations for binding the VPN client session 52 to the network interface 54, implementing the firewall rule 56, and establishing the connection 60 may be performed in an order other than that described herein. It is to be further understood that the VPN client session 52 may be one of multiple router-terminated VPN client sessions provided by the router computing device 12, and that the network interface 54 may be one of multiple network interfaces implemented for use by corresponding VPN client sessions.

Figure 2A:
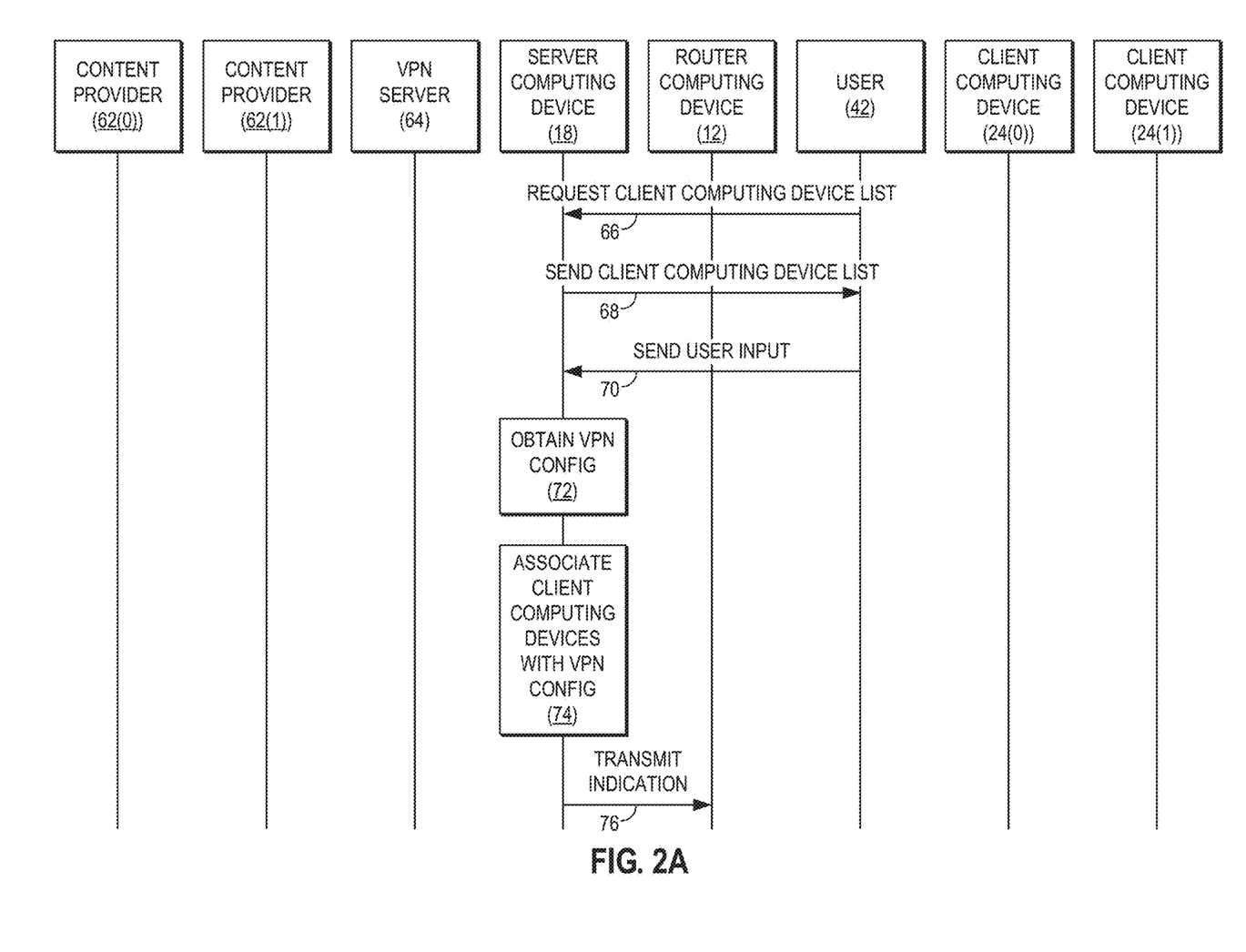
FIGS. 2A and 2B are message sequence diagrams illustrating messages sent and operations performed when establishing router-terminated VPN client sessions and routing network traffic using the VPN client sessions, in accordance with some embodiments.
Figure 2B:
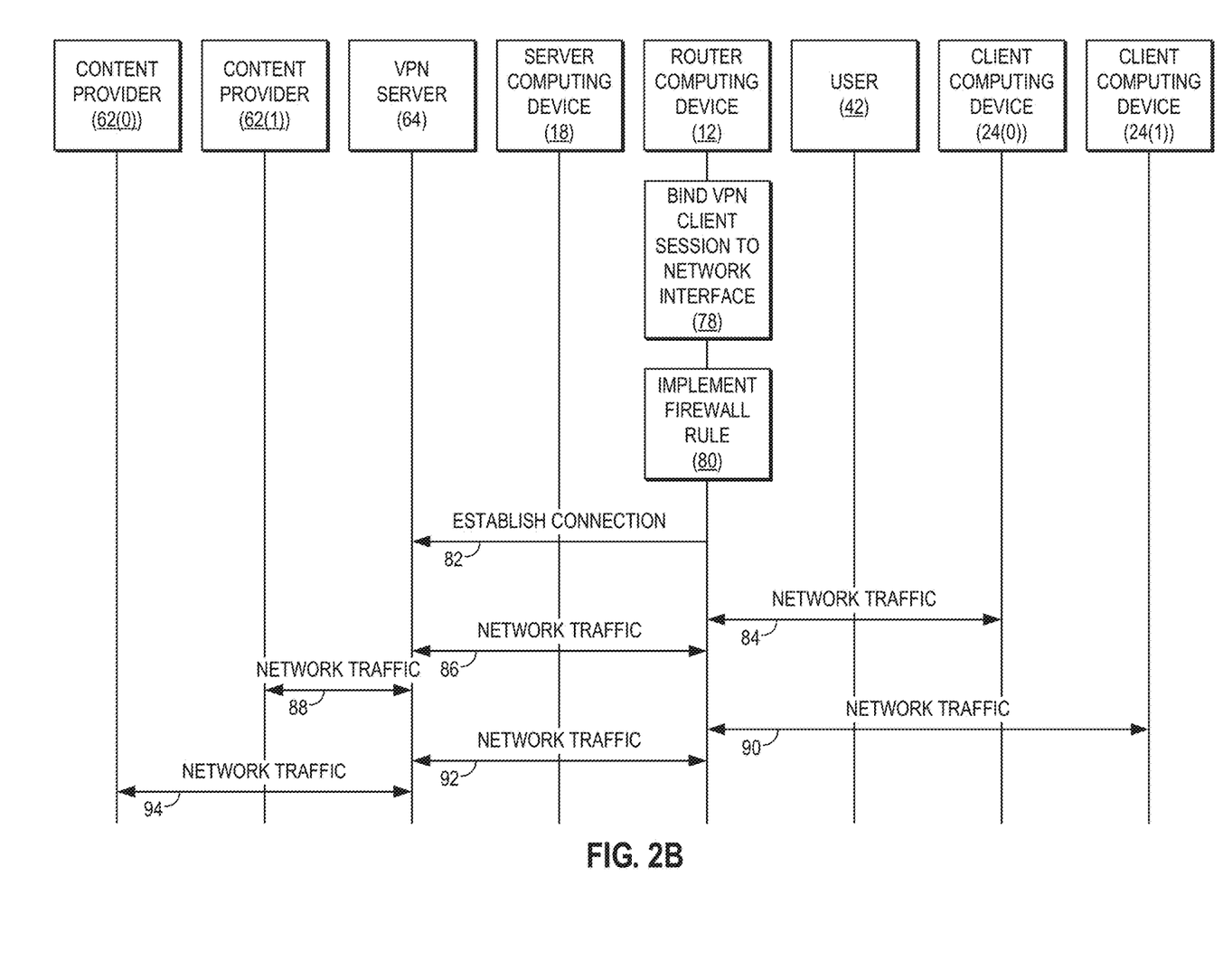

To illustrate messages sent and operations performed when establishing router-terminated VPN client sessions and routing network traffic using the VPN client sessions in accordance with some embodiments, FIGS. 2A and 2B are provided. In FIGS. 2A and 2B, elements of FIG. 1, including the server computing device 18, the router computing device 12, and the user 42, and the client computing devices 24(0) and 24(1), are represented by vertical lines. Additionally, content providers 62(0) and 62(1) (corresponding to the content provider 26 of FIG. 1) and a VPN server 64 (e.g., of the VPN 28 of FIG. 1) are also represented by vertical lines. Communications between the illustrated elements are represented by numbered arrows between the corresponding vertical lines, while operations performed by the illustrated elements are represented by numbered blocks. It is to be understood that, in some embodiments, the communications and operations illustrated herein may be performed in an order other than that shown in FIGS. 2A and 2B, and/or may be omitted.

In FIG. 2A, operations begin with the user 42 requesting a client computing device list from the server computing device 18 (using, e.g., a purpose-built app), as indicated by arrow 66. The server computing device 18 in the example of FIGS. 2A and 2B is an MSO server that maintains a list of the client computing devices 24(0)-24(C) that are connected to the router computing device 12. In response to the request from the user 42, the server computing device 18 sends the list of the client computing devices 24(0)-24(C) to the user 42, as indicated by arrow 68. The user 42 then provides user input, such as the first user input 40, the second user input 44, and the third user input 48, to the server computing device 18 as indicated by arrow 70. In this example, the user input specifies that the client computing device group 46 of FIG. 1, including the client computing devices 24(0) and 24(1), are to be associated with VPN configuration data (such as the VPN configuration data 34 of FIG. 1) to access the VPN server 64.

The server computing device 18 then obtains the VPN configuration data 34 (i.e., from the provided user input), as indicated by block 72. The server computing device 18 next associates the client computing devices 24(0) and 24(1) with the VPN configuration data 34, as indicated by block 74. Finally, the server computing device 18 transmits an indication (such as the indication 32 of FIG. 1) of the association between the client computing devices 24(0) and 24(1) and the VPN configuration data 34, as indicated by arrow 76. Operations then continue in FIG. 2B.

Referring now to FIG. 2B, the router computing device 12 binds a VPN client session (such as the VPN client session 52 of FIG. 1) to a network interface (such as the network interface 54 of FIG. 1), as indicated by block 78. The router computing device 12 also implements a firewall rule (e.g., the firewall rule 56 of FIG. 1) to route network traffic to and from the client computing devices 24(0) and 24(1) via the network interface 54, as indicated by block 80. The router computing device 12 then establishes a connection with the VPN server 64 using the VPN client session 52 and the VPN configuration data 34, as indicated by arrow 82.

The router computing device 12 then receives network traffic for the client computing devices 24(0) and 24(1), and routes the network traffic via the network interface 54. Thus, for example, network traffic from the client computing device 24(0) flows to the router computing device 12, then to the VPN server 64, and finally to the content provider 62(1) (and vice versa), as indicated by arrows 84, 86, and 88, respectively. Similarly, network traffic from the client computing device 24(1) flows to the router computing device 12, then to the VPN server 64, and finally to the content provider 62(0) (and vice versa), as indicated by arrows 90, 92, and 94, respectively.

Figure 3A:
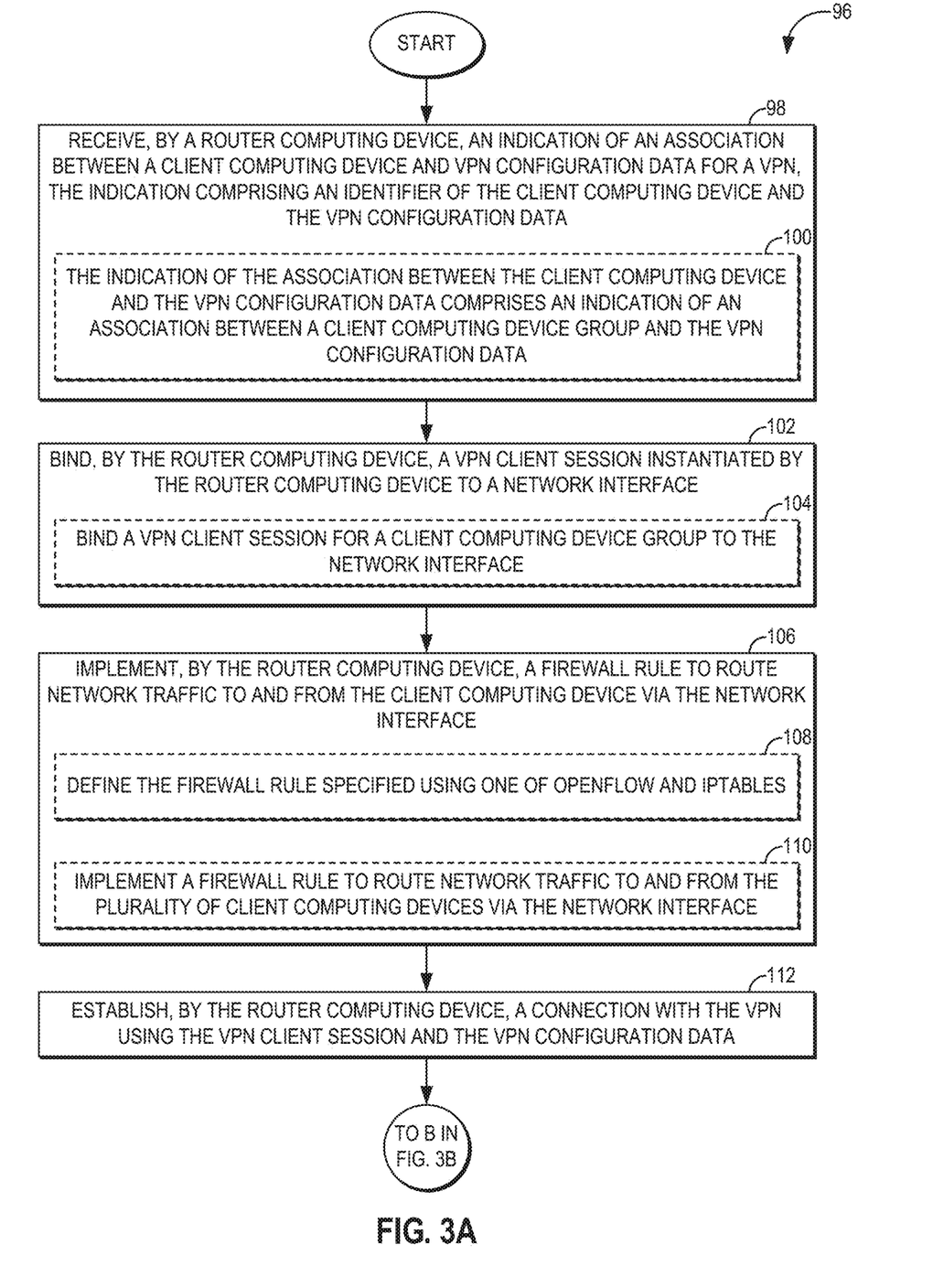
FIGS. 3A and 3B are flowcharts illustrating exemplary operations of the router computing device of FIG. 1 for routing network traffic using router-terminated VPN client sessions, in accordance with some embodiments.
Figure 3B:
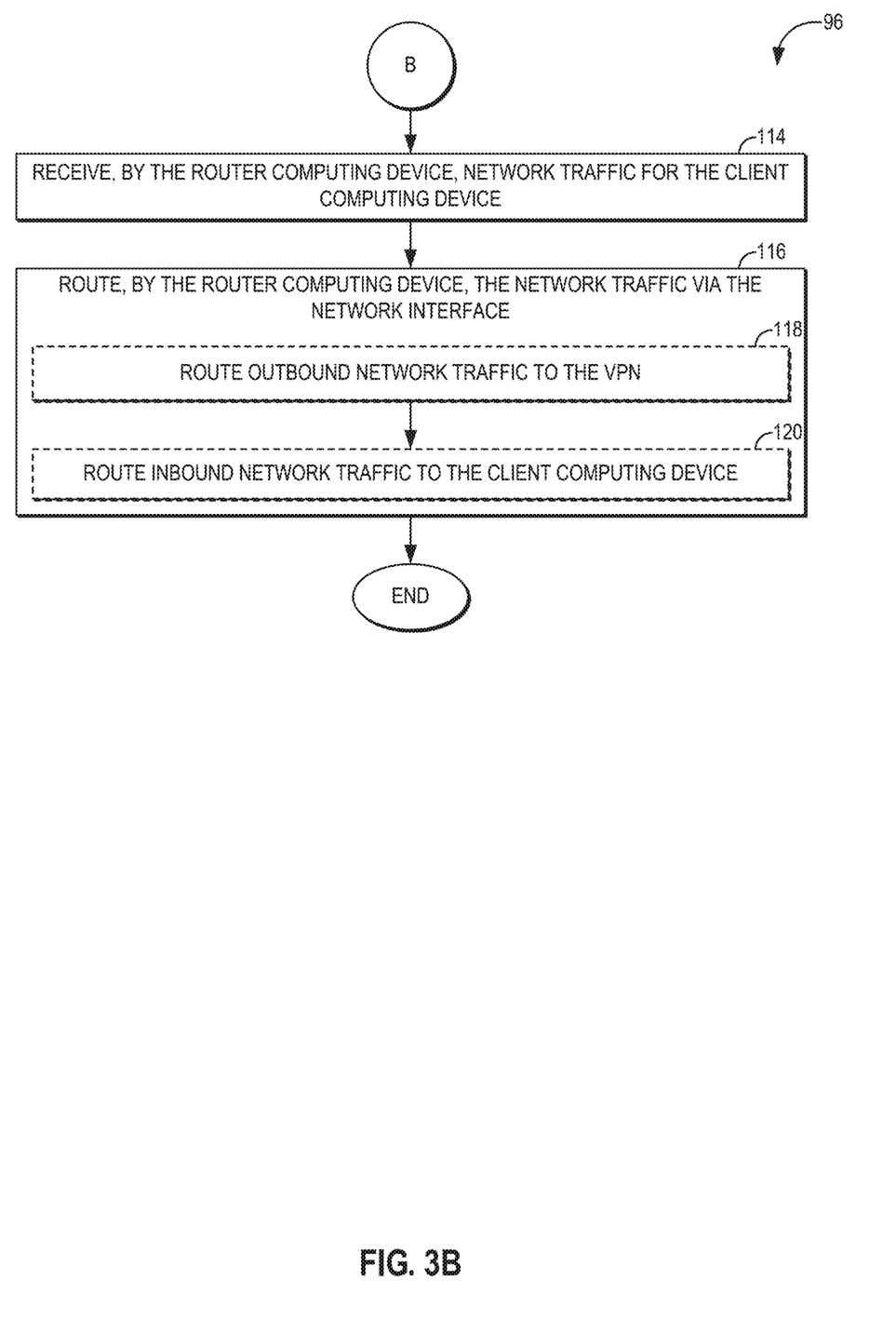

FIGS. 3A and 3B provide a flowchart 96 to illustrate exemplary operations of the router computing device 12 of FIG. 1 for routing network traffic using router-terminated VPN client sessions, in accordance with some embodiments. Elements of FIG. 1 are referenced in describing FIGS. 3A and 3B for the sake of clarity. Operations in FIG. 3A begin with the router computing device 12 receiving the indication 32 of an association between the client computing device 24(0) and the VPN configuration data 34 for the VPN 28, the indication comprising the identifier 36 of the client computing device 24(0) and the VPN configuration data 34 (block 98). In some embodiments, the indication 32 received as part of the operations of block 98 may comprise an indication 32 of an association between the client computing device group 46 and the VPN configuration data 34 (block 100).

The router computing device 12 next binds a VPN client session instantiated by the router computing device 12 (e.g., the VPN client session 52) to a network interface such as the network interface 54 (block 102). Some embodiments may provide that the operations of block 102 include the router computing device 12 binding the VPN client session 52 for a client computing device group, such as the client computing device group 46, to the network interface 54 (block 104). The router computing device 12 implements a firewall rule, such as the firewall rule 56, to route the network traffic 58 to and from the client computing device 24(0) via the network interface 54 (block 106). According to some examples, the operations of block 106 for implementing the firewall rule 56 may include defining a firewall rule 56 specified using one of OpenFlow and iptables (block 108). Some embodiments may provide that the operations of block 106 for implementing the firewall rule 56 may include implementing the firewall rule 56 to route the network traffic 58 to and from the plurality of client computing devices 24(0) and 24(1) of the client computing device group 46 via the network interface 54 (block 110). The router computing device 12 then establishes a connection, such as the connection 60, with the VPN 28 using the VPN client session 52 and the VPN configuration data 34 (block 112). Operations then continue at block 114 of FIG. 3B.

Referring now to FIG. 3B, the router computing device 12 receives the network traffic 58 for the client computing device 24(0) (block 114). The router computing device 12 then routes the network traffic 58 via the network interface 54 (block 116). In some embodiments, the operations of block 116 for routing the network traffic 58 via the network interface 54 may comprise routing outbound traffic from the client computing device 24(0) to the VPN 28 (block 118). The operations of block 116 for routing the network traffic 58 via the network interface 54 may further comprise routing inbound network traffic from the VPN 28 to the client computing device 24(0) (block 120).

Figure 4:
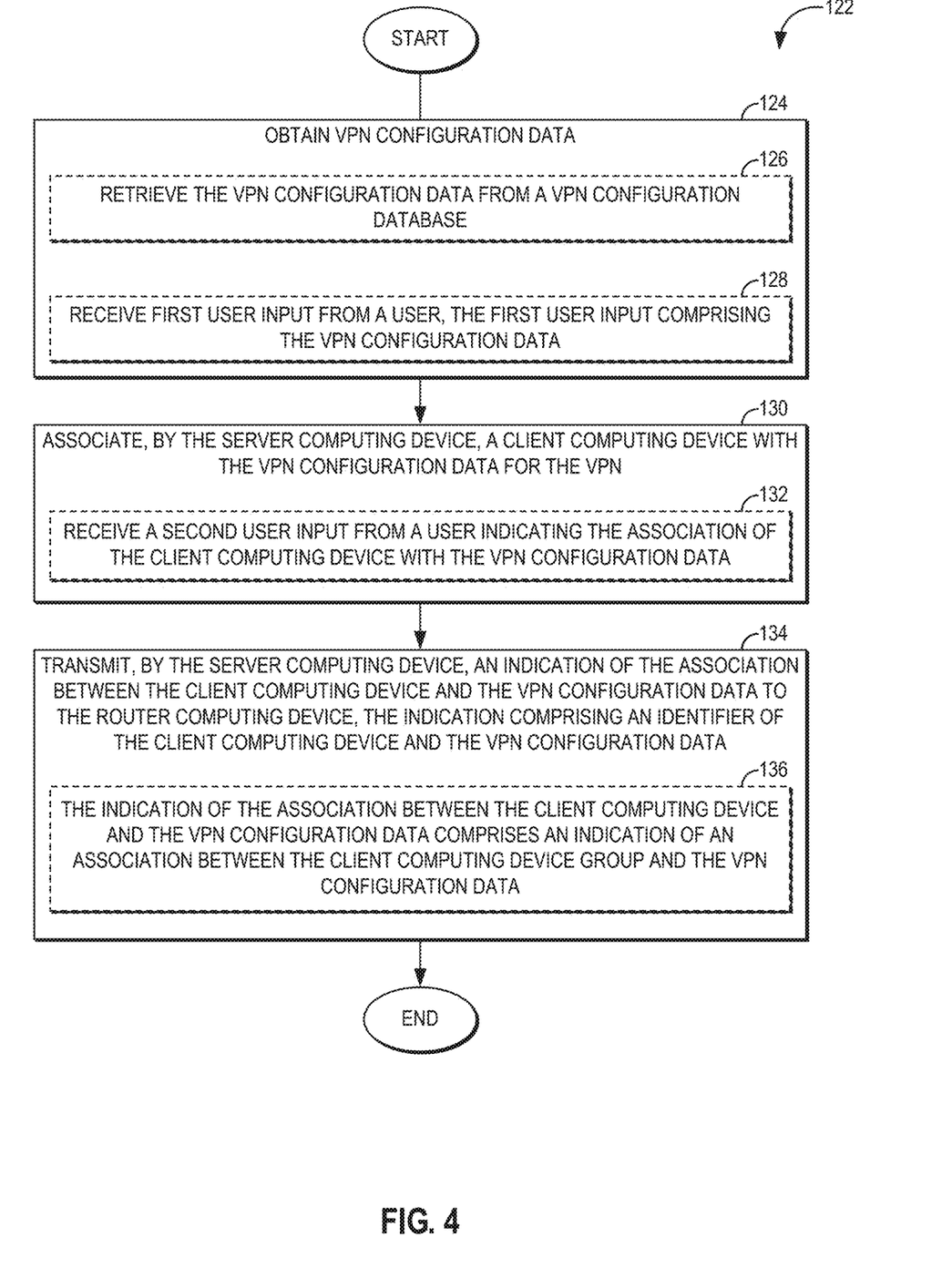
FIG. 4 is a flowchart illustrating exemplary operations of the server computing device of FIG. 1 for obtaining user input to associate a client computing device with VPN configuration data, and providing an indication of such to a router computing device, in accordance with some embodiments.

FIG. 4 provides a flowchart 122 to illustrate exemplary operations of the server computing device 18 of FIG. 1 for obtaining user input to associate a client computing device with VPN configuration data and providing an indication of such to the router computing device 12, in accordance with some embodiments. For the sake of clarity, elements of FIG. 1 are referenced in describing FIG. 4. In FIG. 4, operations begin with the server computing device 18 obtaining VPN configuration data, such as the VPN configuration data 34 (block 124). According to some embodiments, the operations of block 124 for obtaining the VPN configuration data 34 may comprise retrieving the VPN configuration data 34 from a VPN configuration database (e.g., the VPN configuration database 38) (block 126). In some embodiments, the operations of block 124 for obtaining the VPN configuration data 34 may comprise receiving the first user input 40 from the user 42, where the first user input 40 comprises the VPN configuration data 34 (block 128).

The server computing device 18 next associates a client computing device, such as the client computing device 24(0), with the VPN configuration data 34 for the VPN 28 (block 130). In some embodiments in which a single client computing device is associated with the VPN configuration data 34, the operations of block 130 may include the server computing device 18 receiving the second user input 44 from the user 42 indicating the association of the client computing device 24(0) with the VPN configuration data 34 (block 132). Operations in some embodiments for associating a client computing device group (e.g., the client computing device group 46) with the VPN configuration data 34 are discussed in greater detail below with respect to FIG. 5.

The server computing device 18 then transmits an indication of the association between the client computing device 24(0) and the VPN configuration data 34 (such as the indication 32) to the router computing device 12, the indication 32 comprising the identifier 36 of the client computing device 24(0) and the VPN configuration data 34 (block 134). Some embodiments may provide that the indication 32 of the association between the client computing device 24(0) and the VPN configuration data 34 comprises an indication 32 of an association between the client computing device group 46 and the VPN configuration data 34 (block 136).

Figure 5:
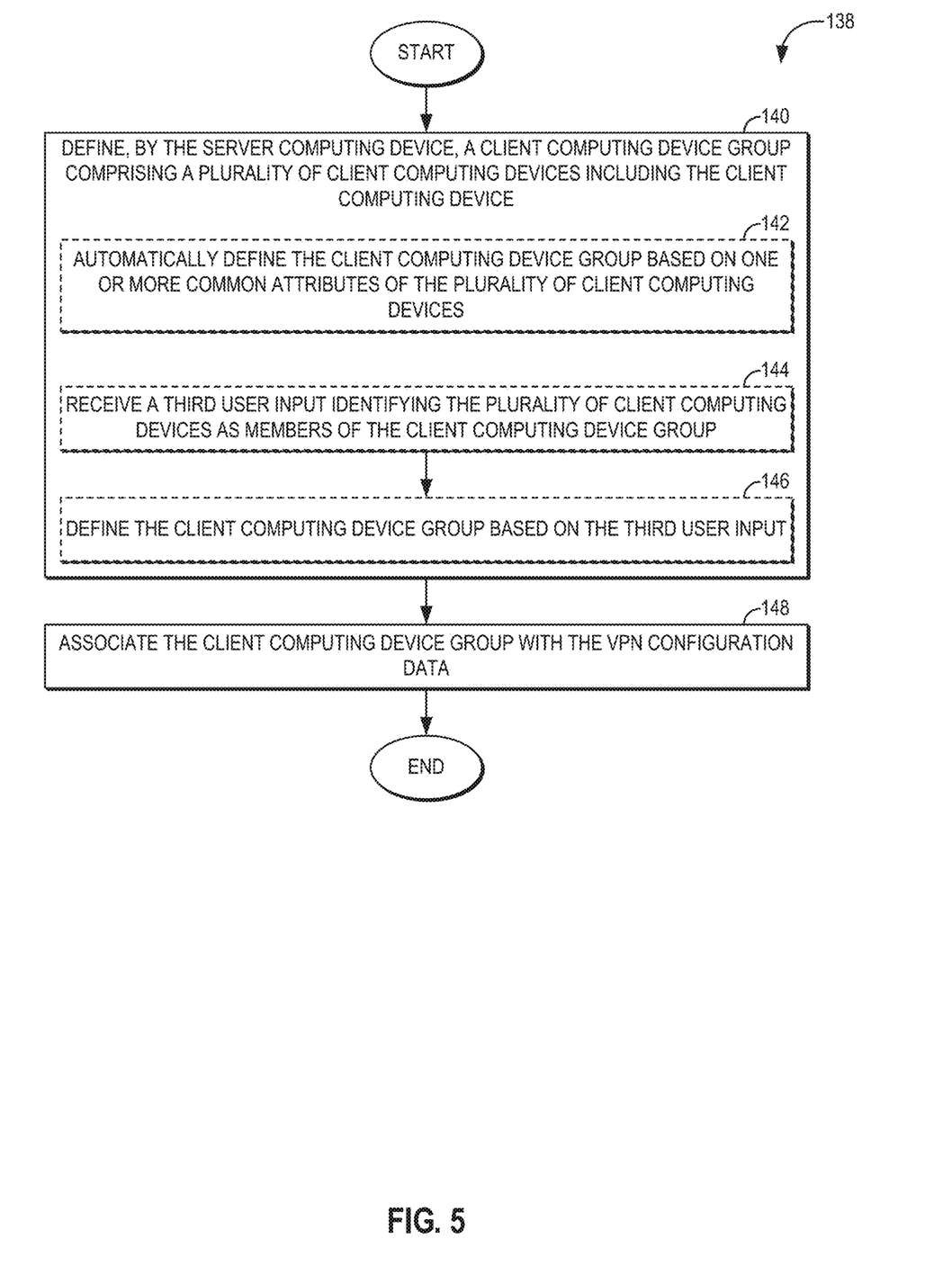
FIG. 5 is a flowchart illustrating exemplary operations of the server computing device of FIG. 1 for associating a group of client computing devices with VPN configuration data, in accordance with some embodiments.

FIG. 5 provides a flowchart 138 illustrating additional exemplary operations of the server computing device 18 of FIG. 1 for associating a client computing device group, such as the client computing device group 46, with VPN configuration data, in accordance with some embodiments. Elements of FIG. 1 are referenced in describing FIG. 5 for the sake of clarity. It is to be understood that the operations described in FIG. 5 may correspond to the operations of block 130 of FIG. 4. Operations in FIG. 5 begin with the server computing device 18 defining a client computing device group (e.g., the client computing device group 46) comprising the plurality of client computing devices 24(0) and 24(1) including the client computing device 24(0) (block 140). In some embodiments, the operations of block 140 for defining the client computing device group 46 may comprise the server computing device 18 automatically defining the client computing device group 46 based on one or more common attributes of the plurality of client computing devices 24(0) and 24(1) (block 142). Some embodiments may provide that the operations of block 140 for defining the client computing device group 46 may comprise the server computing device 18 receiving the third user input 48 identifying the plurality of client computing devices 24(0) and 24(1) as members of the client computing device group 46 (block 144). The server computing device 18 then defines the client computing device group 46 based on the third user input 48 (block 146). After defining the client computing device group 46, the server computing device 18 associates the client computing device group 46 with the VPN configuration data 34 (block 148).

Figure 6:
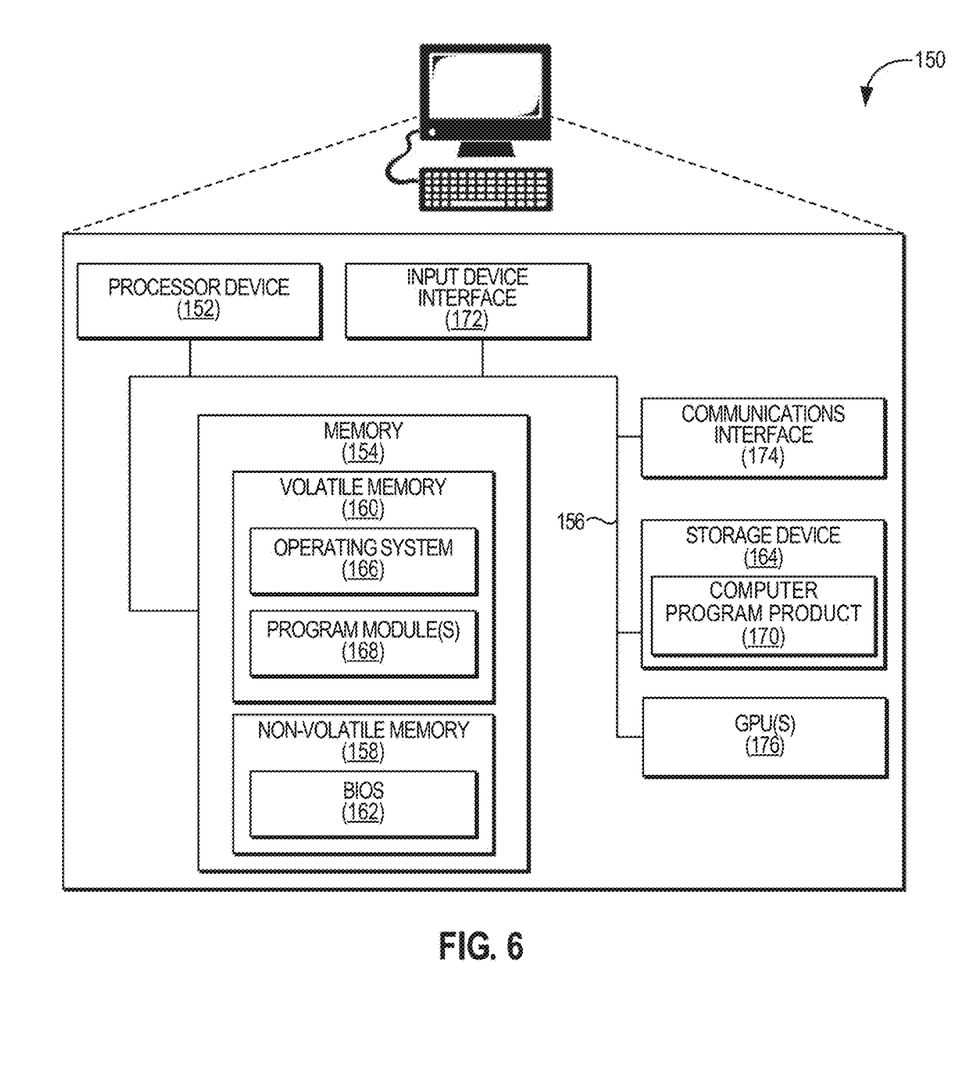
FIG. 6 is a block diagram of a computing device suitable for implementing embodiments disclosed herein.

FIG. 6 is a block diagram of a computing device 150, such as the router computing device 12 and the server computing device 18 of FIG. 1, suitable for implementing examples according to one embodiment. The computing device 150 may comprise any computing or electronic device capable of including firmware, hardware, and/or executing software instructions to implement the functionality described herein, such as a computer server or the like. The computing device 150 includes a processor device 152, a memory 154, and a system bus 156. The system bus 156 provides an interface for system components including, but not limited to, the memory 154 and the processor device 152. The processor device 152 can be any commercially available or proprietary processor.

The system bus 156 may be any of several types of bus structures that may further interconnect to a memory bus (with or without a memory controller), a peripheral bus, and/or a local bus using any of a variety of commercially available bus architectures. The memory 154 may include non-volatile memory 158 (e.g., read-only memory (ROM), erasable programmable read-only memory (EPROM), electrically erasable programmable read-only memory (EEPROM), etc.), and volatile memory 160 (e.g., random-access memory (RAM)). A basic input/output system (BIOS) 162 may be stored in the non-volatile memory 158 and can include the basic routines that help to transfer information between elements within the computing device 150. The volatile memory 160 may also include a high-speed RAM, such as static RAM, for caching data.

The computing device 150 may further include or be coupled to a non-transitory computer-readable storage medium such as a storage device 164, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 164 and other drives associated with computer-readable media and computer-usable media may provide non-volatile storage of data, data structures, computer-executable instructions, and the like. such as the VR content.

A number of modules can be stored in the storage device 164 and in the volatile memory 160, including an operating system 166 and one or more program modules 168, which may implement the functionality described herein in whole or in part. All or a portion of the examples disclosed herein may be implemented as a computer program product 170 stored on a transitory or non-transitory computer-usable or computer-readable storage medium, such as the storage device 164, which includes complex programming instructions, such as complex computer-readable program code, to cause the processor device 152 to carry out the steps described herein. Thus, the computer-readable program code can comprise software instructions for implementing the functionality of the examples described herein when executed by the processor device 152. The processor device 152 may serve as a controller, or control system, for the computing device 150 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 152 through an input device interface 172 coupled to the system bus 156 but can be connected through other interfaces such as a parallel port, an Institute of Electrical and Electronic Engineers (IEEE) 1394 serial port, a Universal Serial Bus (USB) port, an infrared (IR) interface, and the like.

The computing device 150 may also include a communications interface 174 suitable for communicating with a network as appropriate or desired. The computing device 150 includes one or more graphic processing units (GPUs) 176.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
   receiving, by a router computing device, an indication of an association between a client computing device and virtual private network (VPN) configuration data for a VPN, the indication comprising an identifier of the client computing device and the VPN configuration data;
   binding, by the router computing device, a VPN client session instantiated by the router computing device to a network interface;
   implementing, by the router computing device, a firewall rule to route network traffic to and from the client computing device via the network interface;
   establishing, by the router computing device, a connection with the VPN using the VPN client session and the VPN configuration data;
   receiving, by the router computing device, network traffic for the client computing device; and
   routing, by the router computing device, the network traffic via the network interface.

2. The method of claim 1, further comprising:
   obtaining, by a server computing device, the VPN configuration data;
   associating, by the server computing device, the client computing device with the VPN configuration data; and
   transmitting, by the server computing device, the indication of the association between the client computing device and the VPN configuration data to the router computing device.

3. The method of claim 2, wherein obtaining the VPN configuration data comprises retrieving, by the server computing device, the VPN configuration data from a VPN configuration database.

4. The method of claim 2, wherein obtaining the VPN configuration data comprises receiving, by the server computing device, a first user input from a user, the first user input comprising the VPN configuration data.

5. The method of claim 2, wherein associating the client computing device with the VPN configuration data comprises receiving, by the server computing device, a second user input from a user indicating the association of the client computing device with the VPN configuration data.

6. The method of claim 2, wherein:
   associating the client computing device with the VPN configuration data comprises:
      defining, by the server computing device, a client computing device group comprising a plurality of client computing devices including the client computing device; and
      associating the client computing device group with the VPN configuration data;
   the indication of the association between the client computing device and the VPN configuration data comprises an indication of an association between the client computing device group and the VPN configuration data;
   binding the VPN client session for the client computing device to the network interface comprises binding a VPN client session for the client computing device group to the network interface; and
   implementing the firewall rule comprises implementing a firewall rule to route network traffic to and from the plurality of client computing devices via the network interface.

7. The method of claim 6, wherein defining the client computing device group comprises automatically defining the client computing device group based on one or more common attributes of the plurality of client computing devices.

8. The method of claim 6, wherein defining the client computing device group comprises:
   receiving, by the server computing device, a third user input identifying the plurality of client computing devices as members of the client computing device group; and
   defining the client computing device group based on the third user input.

9. The method of claim 1, wherein implementing the firewall rule to route the network traffic to and from the client computing device via the network interface comprises defining a firewall rule specified using one of OpenFlow and iptables.

10. The method of claim 1, wherein:
    the network traffic comprises outbound network traffic from the client computing device and inbound network traffic from the VPN directed to the client computing device; and
    routing the network traffic via the network interface comprises:
       routing the outbound network traffic to the VPN; and
       routing the inbound network traffic to the client computing device.

11. The method of claim 1 wherein the router computing device receives the indication from a server computing device.

12. A router computing device, comprising:
    a system memory; and
    a processor device communicatively coupled to the system memory and configured to:
       receive an indication of an association between a client computing device and virtual private network (VPN) configuration data for a VPN, the indication comprising an identifier of the client computing device and the VPN configuration data;
       bind a VPN client session instantiated by the router computing device to a network interface;
       implement a firewall rule to route network traffic to and from the client computing device via the network interface;
       establish a connection with the VPN using the VPN client session and the VPN configuration data;
       receive network traffic for the client computing device; and
       route the network traffic via the network interface.

13. The router computing device of claim 12, wherein:
    the indication of the association between the client computing device and the VPN configuration data comprises an indication of an association between a client computing device group, comprising a plurality of client computing devices including the client computing device, and the VPN configuration data;
    the processor device is configured to bind the VPN client session for the client computing device to the network interface by being configured to bind a VPN client session for the client computing device group to the network interface; and the processor device is configured to implement the firewall rule by being configured to implement a firewall rule to route network traffic to and from the plurality of client computing devices via the network interface.

14. The router computing device of claim 12, wherein:
the network traffic comprises outbound network traffic from the client computing device and inbound network traffic from the VPN directed to the client computing device; and
routing the network traffic via the network interface comprises:
  routing the outbound network traffic to the VPN; and
  routing the inbound network traffic to the client computing device.

15. A server computing device, comprising:
a system memory; and
a processor device communicatively coupled to the system memory and configured to:
  obtain virtual private network (VPN) configuration data for a VPN;
  associate a client computing device with the VPN configuration data; and
  transmit an indication of an association between the client computing device and the VPN configuration data to a router computing device, the indication comprising an identifier of the client computing device and the VPN configuration data.

16. The server computing device of claim 15, wherein the processor device is configured to obtain the VPN configuration data by being configured to retrieve the VPN configuration data from a VPN configuration database.

17. The server computing device of claim 15, wherein the processor device is configured to obtain the VPN configuration data by being configured to receive the VPN configuration data from a user.

18. The server computing device of claim 15, wherein the processor device is configured to associate the client computing device with the VPN configuration data by being configured to receive a second user input from a user indicating the association of the client computing device with the VPN configuration data.

19. The server computing device of claim 15, wherein:
the processor device is configured to associate the client computing device with the VPN configuration data by being configured to:
  define a client computing device group comprising a plurality of client computing devices including the client computing device; and
  associate the client computing device group with the VPN configuration data; and
the indication of the association between the client computing device and the VPN configuration data comprises an indication of an association between the client computing device group and the VPN configuration data.

20. The server computing device of claim 19, wherein the processor device is configured to define the client computing device group by being configured to:
  receive a third user input identifying the plurality of client computing devices as members of the client computing device group; and
  define the client computing device group based on the third user input.

21. A non-transitory computer-readable storage medium that includes executable instructions configured to cause a router computing device to:
  receive, by the router computing device, an indication of an association between a client computing device and virtual private network (VPN) configuration data for a VPN, the indication comprising an identifier of the client computing device and the VPN configuration data;
  bind, by the router computing device, a VPN client session instantiated by the router computing device to a network interface;
  implement, by the router computing device, a firewall rule to route network traffic to and from the client computing device via the network interface;
  establish, by the router computing device, a connection with the VPN using the VPN client session and the VPN configuration data;
  receive, by the router computing device, network traffic for the client computing device; and
  route, by the router computing device, the network traffic via the network interface.

22. A method, comprising:
  obtaining, by a server computing device, virtual private network (VPN) configuration data for a VPN;
  associating, by the server computing device, a client computing device with the VPN configuration data; and
  transmitting, by the server computing device, an indication of an association between the client computing device and the VPN configuration data to a router computing device, the indication comprising an identifier of the client computing device and the VPN configuration data.

23. A non-transitory computer-readable storage medium that includes executable instructions configured to cause a server computing device to:
  obtain, by the server computing device, virtual private network (VPN) configuration data for a VPN;
  associate, by the server computing device, a client computing device with the VPN configuration data; and
  transmit, by the server computing device, an indication of an association between the client computing device and the VPN configuration data to a router computing device, the indication comprising an identifier of the client computing device and the VPN configuration data.

* * * * *